C. O. HEDSTROM.
SIDE CAR CONSTRUCTION.
APPLICATION FILED AUG. 7, 1917.
1,267,661.
Patented May 28, 1918.
3 SHEETS—SHEET 1.
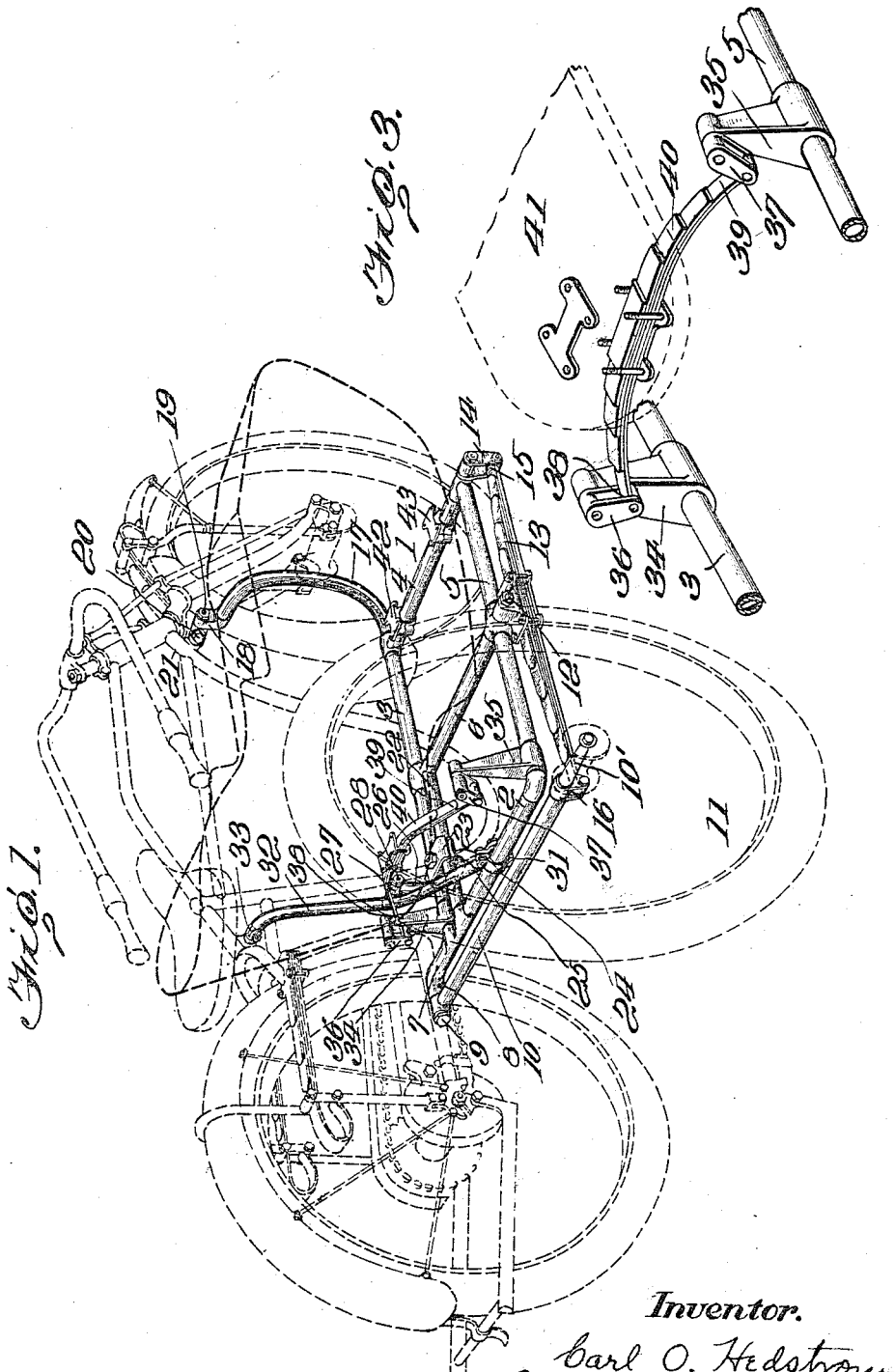
Inventor.
Carl O. Hedstrom
By Sturtevant & Mason
Attorneys.

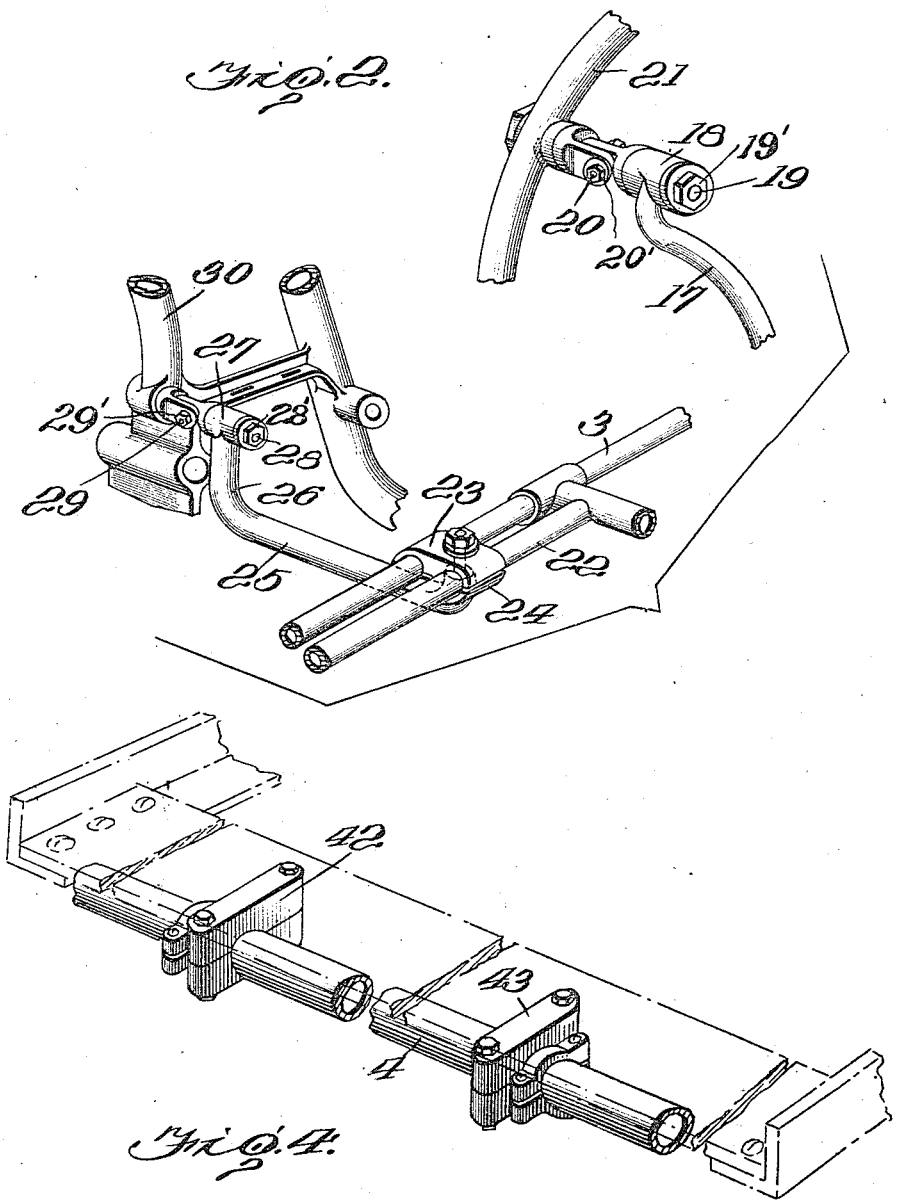

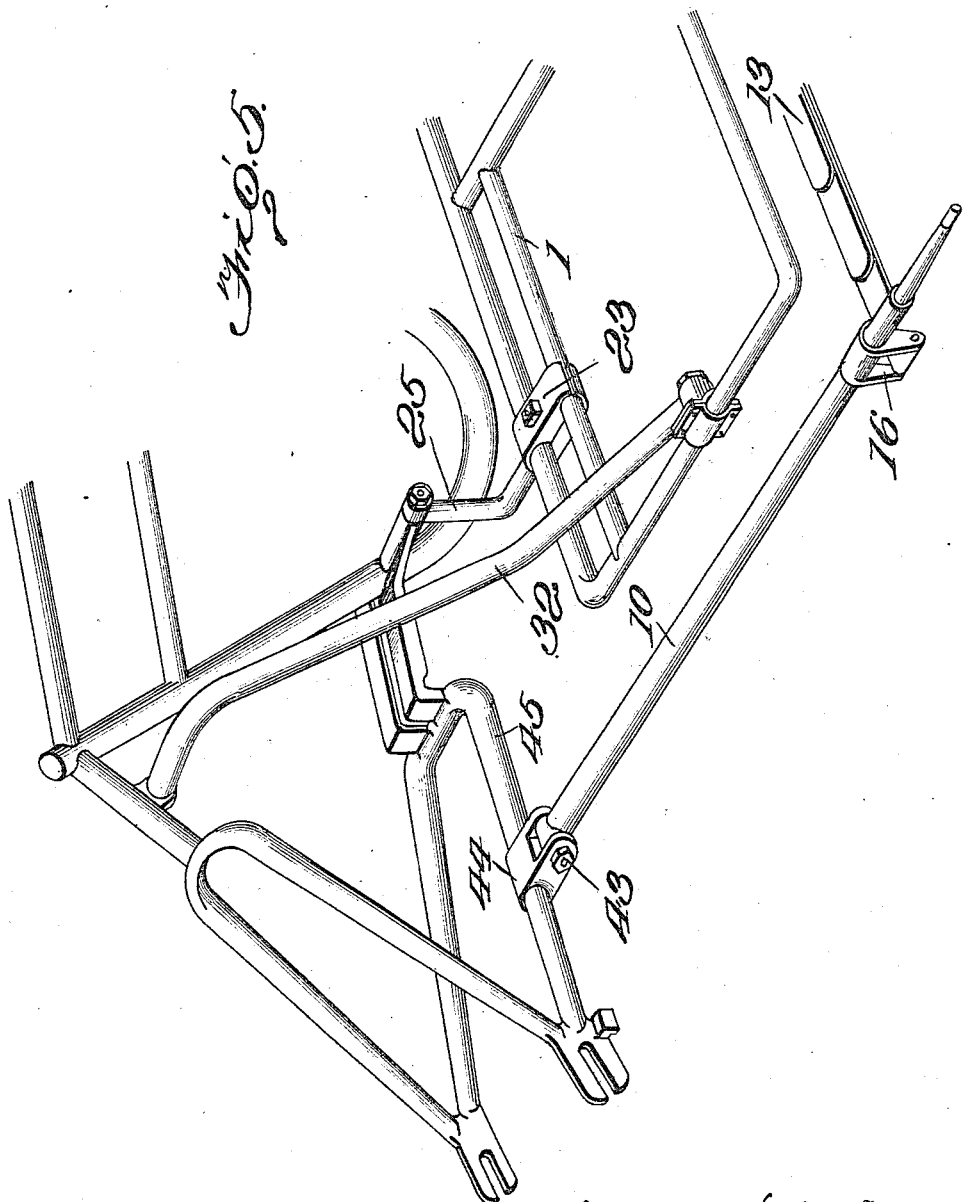

UNITED STATES PATENT OFFICE.

CARL O. HEDSTROM, OF PORTLAND, CONNECTICUT, ASSIGNOR TO HENDEE MANUFACTURING COMPANY, OF SPRINGFIELD, MASSACHUSETTS, A CORPORATION OF MASSACHUSETTS.

SIDE-CAR CONSTRUCTION.

1,267,661.   Specification of Letters Patent.   Patented May 28, 1918.

Application filed August 7, 1917. Serial No. 184,925.

*To all whom it may concern:*

Be it known that I, CARL O. HEDSTROM, a citizen of the United States, residing at Portland, in the county of Middlesex, State of Connecticut, have invented certain new and useful Improvements in Side-Car Constructions, of which the following is a description, reference being had to the accompanying drawing, and to the figures of reference marked thereon.

My invention relates to improvements in side cars for motorcycles.

The object of my invention is to provide a car of this character in which the axle thereof has a cantaliver spring connection with the frame of the car and said frame is adjustably connected to the frame of the motorcycle, so that the road shocks on the wheel of the car will not be imparted to the frame of the motorcycle.

Another object of my invention is to provide a semi-elliptical spring support for the body of the side car, so that all of the shocks of the wheel will not be transferred to the same.

A still further object of the invention is to provide a cheap, simple and effective side car adapted to accomplish the above results, the details of structure and operation being hereinafter more fully described.

In the accompanying drawings,—

Figure 1 is a perspective view of a motorcycle in dotted lines and showing my improved car attached thereto;

Fig. 2 is an enlarged perspective view, showing the forward and rear connection of the car with the motorcycle frame;

Fig. 3 is an enlarged perspective view, showing the semi-elliptical spring for supporting the body of the car;

Fig. 4 is an enlarged perspective view of the forward support for the body of the car; and Fig. 5 is a modified form of side car frame adapted for use on a rigid frame motorcycle.

Referring now to the drawings, 1 represents a rectangular frame made of the tubular bars 2, 3, 4 and 5 secured together in the usual manner employed in the manufacture of bicycle or motorcycle frames. The two longitudinal side bars 3 and 5 are connected by an intermediate transverse bar 6 bracing the rectangular frame. The rear bar 2 of the frame is extended inwardly beyond the bar 3, as indicated at 7 and has its inner end turned laterally at 8 parallel to the bar 3 and the frame of the motorcycle. Pivotally mounted in the laterally turned end 8 at 9, is a bar 10, which extends outwardly a short distance beyond the outer side car 5 and is provided with a wheel spindle 10' on which the car wheel 11 is mounted.

Carried by the outer bar 5 of the frame 1 opposite the transverse bar 6, is a pintle 12 upon which is intermediately mounted the cantaliver spring 13, adapted to oscillate on the pivot and forming the point of suspension thereof. The forward end of the frame has pivotally mounted thereon the links 14, between which is pivotally connected the forward end 15 of the cantaliver spring 13. The opposite or rear end of the spring is pivotally connected between arms 16, rigidly supported by the axle bar 10 on the inside of the spindle 10'. By this structure it will be seen that shocks on the wheel cause the bar 10 to rock upon its pivot 9 and the movement thereof is taken up by the intermediately pivoted cantaliver spring 13.

The inner side bar 3 of the frame is extended upwardly in a curved form, as indicated at 17, having a bearing 18 at its upper end loosely mounted upon the pintle 19. The inner end of the pintle is pivotally mounted upon a horizontal pivot 20 carried by the frame 21 of the motorcycle, whereby the bar 17 may be horizontally and vertically adjusted with respect to the motorcycle frame and locked in its adjusted position by nuts 19' and 20'. The frame 1 has a bar 22 connecting the bars 2 and 6. Clamped on the bars 3 and 22 are the members 23 and 24, the member 24 carrying a bar 25, which extends inwardly and has an upwardly bent inner end 26, whereby the proper adjustment of the car can be made. The upper end of the portion 26 of the bar 25 is provided with a bearing 27, mounted upon a pintle 28. The inner end of the pintle 28 is mounted upon a horizontal bolt 29 carried by the rear frame 30 of the motorcycle, whereby the rear end of the car frame is mounted to have a vertical and a horizontal adjustment in respect to the motorcycle, by means of nuts 28' and 29'.

Connected to the bar 2 at 31 is a brace 32, which extends upwardly and is pivotally connected at 33 to the motorcycle frame directly below the seat, as clearly shown in Fig. 1 of the drawings. The connection 31 is such that it slides longitudinally of the bar, so as to allow for the vertical and horizontal swinging of the car frame heretofore referred to.

The bars 3 and 5 are provided with upwardly extending arms 34 and 35, rigid with the bars and carrying the links 36 and 37, in which are pivotally supported the free ends 38 and 39 of the spring 40. The spring 40 is adapted to be secured to the lower face of the body 41 of the car, as shown in dotted lines in Fig. 3. The bar 4 has mounted thereon, to oscillate, the two blocks 42 and 43, which have their upper ends secured to the bottom of the body of the car, so that the forward end of the body can oscillate on the bar when the rear end moves up and down with the spring 40.

The modification shown in Fig. 5 of the drawings is designed for rigid frame motorcycles. In this form the frame 1 is made exactly like the frame in the preferred form, with the exception that the arm 7 is left off and instead of connecting the bar 10 to the side car frame, it is pivotally connected at 43 to the bracket 44, rigidly secured to the rear fork 45 of the motorcycle frame. The operation of the bar, axle and cantaliver spring is precisely the same as that shown in the preferred form, where the bar 10 is connected to the side car frame, this being necessary where the motorcycle frame is of the spring form type.

From the foregoing description it will be seen that I have produced a side car for motorcycles in which the frame has a cantaliver spring connection with the free outer end of the pivoted axle-carrying bar, so that the shocks on the wheel of the car will be largely taken up by the spring and not imparted to the motorcycle.

I have also provided a spring arrangement for supporting the body of the car, whereby the body will not be subject to all of the shocks received by the frame.

In brief by this arrangement, the rear axle has a "give", which takes the strain off the motorcycle frame, prevents transmission of shocks from side car to motorcycle and vice versa, and, therefore, minimizes the danger of breakage of frames.

Having thus described my invention, what I claim as new and desire to secure by Letters Patent, is:—

1. A side car comprising a frame, means for connecting the frame to the chassis of a motorcycle, a pivoted axle, and a cantaliver spring connection between the axle and frame.

2. A side car comprising a frame, means for connecting the frame to the chassis of a motorcycle, an axle pivoted at its inner end, and a cantaliver spring connection between the frame and outer end of the axle.

3. A side car comprising a frame, means for connecting the frame to the chassis of a motorcycle, an axle pivoted at its inner end and at its outer end extending beyond the frame, a wheel mounted on the axle beyond the frame, and a cantaliver spring connection between the frame and the axle on the inside of the wheel.

4. A side car comprising a frame, means for adjustably connecting the frame to the chassis of a motorcycle, an axle pivoted at its inner end and its outer end extending beyond the frame, a wheel mounted on the axle beyond the frame, and a cantaliver spring connected to the axle on the inside of the wheel and connected to the frame.

5. A side car comprising a frame, means for connecting the frame to the chassis of a motorcycle, a pivoted axle carried by the frame, and a cantaliver spring connection between the axle and frame.

6. A side car comprising a frame, means for adjustably connecting the frame to the chassis of a motorcycle, a pivoted axle carried by the inner side of the frame, and a cantaliver spring connection between the frame and outer end of the axle.

7. A side car comprising a frame, means for adjustably connecting the frame to the chassis of a motorcycle, an axle pivoted to the side of the frame adjacent the chassis connection, and a cantaliver connection between the frame and outer end of the axle.

8. A side car comprising a frame, means for connecting the frame to the chassis of a motorcycle, an axle pivoted to the frame adjacent the connection with the chassis and extending out beyond the frame, a wheel mounted on the axle, and a cantaliver spring connection between the frame and the axle on the inside of the frame.

9. A side car comprising a frame, means for pivotally connecting the frame to the frame of a motorcycle to have a limited horizontal and vertical adjustable movement, an axle pivoted to the frame, and a cantaliver spring connected to the axle intermediate its free and pivoted ends.

10. A side car comprising a frame, means for connecting it to the frame of a motorcycle, an axle pivoted to one side of the frame and extending beyond the other side of the frame, a wheel mounted on the axle beyond the frame, and a cantaliver spring secured to the frame and having one end connected to the axle on the inside of the wheel.

11. A side car comprising a frame, means for connecting it to the end of the motorcycle frame, an axle pivoted to one side of the frame and extending beyond the other side of the frame, a wheel mounted on the axle beyond the frame, and a cantaliver spring pivoted to the frame and having one end linked to the frame and its opposite end pivoted to the axle on the inside of the wheel.

12. A side car comprising a frame, means for connecting it to the motorcycle frame, an axle pivoted to one side of the frame and extending beyond the other side of the frame, a wheel mounted on the axle beyond the frame, an intermediately pivoted cantaliver spring carried by the frame and having one end linked to the frame and its opposite end pivoted to the axle on the inside of the wheel.

13. A side car comprising a frame, a body on the frame, a vertical and horizontal pivotal connection between the frame and the motorcycle frame, an axle pivoted to the frame adjacent the inner side and extending beyond the outside of the frame, a cantaliver spring pivoted to the frame intermediate its end, a link connection between the forward end of the spring and the frame, and a pivoted connection between the rear end of the spring and the axle on the inside of the wheel carried by the axle.

14. A side car comprising a frame, a body supported by the frame, a vertical and horizontal pivotal adjustable connection between the frame and the motor cycle frame, an axle pivoted to the frame adjacent the inner side of the frame and extending beyond the outside of the frame, a cantaliver spring intermediately pivoted to the frame intermediate its ends, a link connection between the forward end of the spring and frame, a pivotal connection between the rear end of the spring and the axle on the inside of the wheel carried by the axle, and a brace pivoted to the motorcycle frame and having a sliding and oscillating connection with the frame.

15. A side car comprising a frame, a body pivoted to the forward end of the frame, a spring carried by the rear end of the body with its free ends linked to the frame, a vertical and horizontal pivotal connection between the frame and the frame of the motorcycle, an axle pivoted to the frame adjacent the inner side of the frame and extending beyond the outside of the frame, a cantaliver spring pivoted to the outside of the frame intermediate its ends, a link connection between the forward end of the frame and the spring, a pivotal connection between the rear end of the spring and the axle on the inside of the wheel, and a brace pivoted to the motorcycle frame and having a sliding and oscillating connection with the frame.

16. A side car comprising a frame, means for connecting the frame to the chassis of a motorcycle, an axle pivotally connected to the chassis of the motorcycle, and a cantaliver spring connection between the axle and frame.

17. A side car comprising a frame, means for connecting the frame to the chassis of a motorcycle, an axle pivotally connected to the rear fork of the motorcycle chassis, and a cantaliver spring connection between the free end of the axle and the frame.

18. A side car comprising a frame, means for connecting the frame to the chassis of a motorcycle, a pivoted axle, and spring connection between axle and frame.

19. A side car comprising a frame, means for connecting the frame to the chassis of a motorcycle, a pivoted axle, and a spring connection between the outer end of the axle and the frame.

20. A side car comprising a frame, means for connecting the frame to the chassis of a motorcycle, an axle pivoted at its inner end, a wheel mounted on the outer end of the axle and a spring connection between the frame and the axle on the inside of the wheel.

21. A side car comprising a frame, means for connecting the frame to the chassis of a motorcycle, an axle pivoted to the inner end of the frame and extending out beyond the frame, a wheel mounted on the axle beyond the frame, and a spring connection between the frame and the axle on the inside of the wheel.

22. A side car comprising a frame, means for connecting the frame to the chassis of a motorcycle, an axle pivoted to the side of the frame adjacent the chassis connection, and a spring connection between the frame and the axle.

23. A side car comprising a frame, means for connecting the frame to the chassis of a motorcycle, an axle pivoted to the side of the frame adjacent the chassis and extending beyond the outside of the frame, a wheel carried by the outer end of the axle, a spring secured to the frame and having its free end connected to the axle on the inside of the wheel and a brace connecting the frame and chassis of the motorcycle.

In testimony whereof, I affix my signature, in the presence of two witnesses.

CARL O. HEDSTROM.

Witnesses:
John D. Stephens,
John T. Cronin.

Copies of this patent may be obtained for five cents each, by addressing the "Commissioner of Patents, Washington, D. C."